US008686932B2

(12) United States Patent
Kang et al.

(10) Patent No.: US 8,686,932 B2
(45) Date of Patent: Apr. 1, 2014

(54) LIQUID CRYSTAL DISPLAY DEVICE AND METHOD FOR DRIVING THE SAME

(75) Inventors: Byung Koo Kang, Gumi-si (KR); Eui Tae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1047 days.

(21) Appl. No.: 11/641,719

(22) Filed: Dec. 20, 2006

(65) Prior Publication Data

US 2007/0268229 A1 Nov. 22, 2007

(30) Foreign Application Priority Data

May 22, 2006 (KR) ........................ 10-2006-0045641

(51) Int. Cl.
*G09G 3/36* (2006.01)
*G02F 1/1343* (2006.01)

(52) U.S. Cl.
USPC .............................................. 345/87; 349/144

(58) Field of Classification Search
USPC ............. 349/73–84, 141, 109, 145, 146, 144, 349/108, 139, 143; 345/156, 204–215, 345/84–104, 690–699
See application file for complete search history.

(56) References Cited

U.S. PATENT DOCUMENTS

| | | | | |
|---|---|---|---|---|
| 4,781,438 | A * | 11/1988 | Noguchi | 349/54 |
| 4,822,142 | A * | 4/1989 | Yasui | 349/48 |
| 5,717,474 | A * | 2/1998 | Sarma | 349/85 |
| 6,014,193 | A * | 1/2000 | Taira et al. | 349/73 |
| 6,232,938 | B1 * | 5/2001 | Tsuchida et al. | 345/88 |
| 6,242,746 | B1 * | 6/2001 | Teranuma et al. | 250/370.13 |
| 6,396,554 | B1 * | 5/2002 | Matsuda | 349/139 |
| 6,552,706 | B1 * | 4/2003 | Ikeda et al. | 345/96 |
| 6,559,821 | B2 * | 5/2003 | Ichikawa et al. | 345/92 |
| 6,809,719 | B2 * | 10/2004 | Wu et al. | 345/103 |
| 7,002,652 | B2 * | 2/2006 | Wen et al. | 349/114 |
| 7,206,051 | B2 * | 4/2007 | Lee et al. | 349/141 |
| 7,333,170 | B2 * | 2/2008 | Baek | 349/141 |
| 7,796,106 | B2 * | 9/2010 | Ha | 345/88 |
| 7,808,494 | B2 * | 10/2010 | Lee et al. | 345/206 |
| 7,924,387 | B2 * | 4/2011 | Hung | 349/144 |
| 8,026,988 | B2 * | 9/2011 | Ong | 349/37 |
| 2001/0019383 | A1 * | 9/2001 | Shin et al. | 349/106 |
| 2003/0169247 | A1 * | 9/2003 | Kawabe et al. | 345/204 |
| 2003/0193625 | A1 * | 10/2003 | Yoshida et al. | 349/43 |
| 2004/0085495 | A1 * | 5/2004 | Roh et al. | 349/106 |
| 2004/0085503 | A1 * | 5/2004 | Kim et al. | 349/141 |
| 2004/0150777 | A1 * | 8/2004 | Koike | 349/139 |

(Continued)

FOREIGN PATENT DOCUMENTS

| | | |
|---|---|---|
| CN | 1612024 | 5/2005 |
| CN | 1755440 | 4/2006 |

(Continued)

*Primary Examiner* — Alexander Eisen
*Assistant Examiner* — Patrick F Marinelli
(74) *Attorney, Agent, or Firm* — McKenna Long & Aldridge

(57) ABSTRACT

A liquid crystal display (LCD) device includes: a plurality of gate lines; a plurality of data lines that cross the gate lines to define pixel regions; a plurality of thin film transistors at the crossings of the gate and data lines, the thin film transistors of vertically adjacent pixels each connected to a shared gate line of the plurality of gate lines and on opposite sides of the shared gate line; and a plurality of pixel electrodes in the pixel regions, wherein each pixel electrode of the plurality of pixel electrodes is formed in two horizontally-adjacent pixel regions.

13 Claims, 5 Drawing Sheets

(56) References Cited

U.S. PATENT DOCUMENTS

| | | | | |
|---|---|---|---|---|
| 2004/0252249 | A1* | 12/2004 | Hong | 349/37 |
| 2004/0263743 | A1* | 12/2004 | Kim et al. | 349/139 |
| 2004/0263744 | A1* | 12/2004 | Lee et al. | 349/139 |
| 2005/0094078 | A1* | 5/2005 | Kang | 349/141 |
| 2005/0275644 | A1* | 12/2005 | Shen et al. | 345/204 |
| 2006/0145983 | A1* | 7/2006 | Lee et al. | 345/92 |
| 2007/0030233 | A1* | 2/2007 | Chai et al. | 345/98 |
| 2007/0057883 | A1* | 3/2007 | Cho et al. | 345/88 |
| 2007/0120810 | A1* | 5/2007 | You et al. | 345/103 |
| 2007/0171184 | A1* | 7/2007 | Han et al. | 345/103 |
| 2007/0195569 | A1* | 8/2007 | Lee et al. | 365/39 |
| 2008/0049176 | A1* | 2/2008 | Kim et al. | 349/114 |
| 2011/0149225 | A1* | 6/2011 | Hung | 349/144 |

FOREIGN PATENT DOCUMENTS

| | | | |
|---|---|---|---|
| KR | 10-1994-0002646 | A | 2/1994 |
| KR | 10-2005-0045170 | A | 5/2005 |
| TW | 200305764 | | 11/2003 |
| TW | I223228 | | 11/2004 |
| TW | 200521585 | | 7/2005 |
| TW | 200530721 | | 9/2005 |

* cited by examiner

LIQUID CRYSTAL DISPLAY DEVICE AND METHOD FOR DRIVING THE SAME

This application claims the benefit of Korean Patent Application No. 10-2006-0045641, filed on May 22, 2006, which is hereby incorporated by reference for all purposes as if fully set forth herein.

BACKGROUND OF THE INVENTION

1. Field of the Invention

The present invention relates to a liquid crystal display (LCD) device and more particularly to an LCD device and a method for driving the same.

2. Discussion of the Related Art

Among various ultra-thin flat type display devices, which include devices having a display screen thickness several centimeters or less, liquid crystal display (LCD) devices are widely used for notebook computers, monitors, and spacecraft and aircraft displays because or their advantages such as low operating voltage, low power consumption, and portability.

A typical LCD device includes a lower substrate, an upper substrate, and a liquid crystal layer formed between the substrates.

Gate lines and data lines substantially perpendicular to the gate lines are formed on the lower substrate. The data lines and gate lines cross each other to define pixel regions. A thin film transistor (TFT) is formed at crossings of the gate lines and data lines.

Light shield layers are formed on the upper substrate to prevent leakage of light from regions corresponding to the gate lines, data lines, and TFTs. Color filter layers are also formed on the upper substrate between the adjacent light-shielding layers to transmit light of particular wavelengths.

The color filter layers add significantly to the manufacturing costs for a liquid crystal display device.

In order to solve this problem, an LCD device driven using a field sequential driving system has been developed.

FIG. 1 is a perspective view schematically illustrating a LCD device of the related art using a field sequential driving system.

As shown in FIG. 1, the LCD device of the related art includes a lower substrate 1, an upper substrate 2, and a liquid crystal layer (not shown) formed between the substrates 1 and 2.

Gate lines 10 and data lines 20 are formed on the lower substrate 1. The gate lines 10 and data lines 20 cross each other to define pixel regions 30. A TFT 41 functioning as a switching device is formed at each crossing of the gate lines 10 and data lines 20. A pixel electrode 35 is formed at each pixel region 30 and the pixel electrode 35 is connected to the TFT 41. A backlight unit 50 is arranged at a lower surface of the lower substrate 1, to irradiate light onto the lower substrate 1.

The backlight unit 50 includes a red light source 51, a green light source 52, and a blue light source 53.

A light shield layer 70 is formed on the upper substrate 2, in order to prevent leakage of light from regions where the gate lines 10, data lines 20, and TFTs 41 are arranged. A common electrode 80 is formed on the upper substrate 2 including the light shield layer 70.

In an LCD device using a field sequential driving method, no color filter is used in order to achieve an enhancement in the transmittance of light. To this end, the LCD device temporally reproduces color. That is, in the LCD device, various colors are displayed in a color reproduction period that is less than the temporal visual resolution to display a desired color.

By avoiding the forming of color filter layers in the LCD device, it is possible to save the costs of color filters and to achieve an improvement in color characteristics and image reproduction characteristics.

FIG. 2 is a timing diagram for explaining driving of the field sequential driving type LCD device of the related art shown in FIG. 1.

As shown in FIG. 2, in the field sequential driving type LCD device, one frame is time-divided into three sub-frames. A red (R) light source may be operated during the first sub-frame. During the second sub-frame a green (G) light source may be operated. During the third sub-frame a blue (B) light source may be operated.

In the field sequential driving type LCD device, the temporal period during which color is reproduced has a value less than the temporal visual resolution because one frame is sub-divided into three sub-frames. Accordingly, full color display may be achieved without using color filters.

In the first sub-frame, red (R) data is charged to a first pixel for a data charging time corresponding to a scan pulse from the gate line 10. After the response time of liquid crystal elapses the R light source is turned on.

In the second sub-frame the R light source is turned off and green (G) data is charged in a second pixel for a data charging time corresponding to a scan pulse from the gate line 10. After the response time of liquid crystal elapses the G light source is turned on.

In the third sub-frame the B light source is turned off and blue (B) data is charged in a third pixel for a data charging time corresponding to a scan pulse from the gate line 10. After the response time of liquid crystal elapses the B light source is turned on.

When the R light source is turned on, R light is emitted, so that an image according to the R light is displayed on a liquid crystal panel. Similarly, when the G or B light source is turned on, an image according to G or B light is displayed.

By sequentially turning on all the R, G, and B light sources during each frame, it is possible to display a desired color.

In the above-described sequential driving LCD device, however, each gate line is to be driven for a predetermined time within one frame period. Accordingly, as the number of gate lines is increased (for example to produce an LCD device of increased size) the time available for driving each gate line is shortened.

When the driving time for each gate line is shortened, the turn-on time of the TFTs connected to each gate line is shortened. As a result, for large sized LCD devices, there may be insufficient time to completely charge a data voltage into the pixels.

Although this problem may be at least partially addressed by increasing the size of the TFTs, there is a limitation in increasing the TFT size due to an associated design rule and problems associated with maintaining an aperture ratio.

SUMMARY OF THE INVENTION

Accordingly, the present invention is directed to a liquid crystal display device and a method for driving the same that substantially obviate one or more problems due to limitations and disadvantages of the related art.

An advantage of the present invention is to provide a liquid crystal display device and a method for driving the same which are capable of supplying a scan pulse from one gate line to vertically-adjacent pixels, and thus, securing a sufficient data charging time even when one frame is driven under the condition in which the frame is divided into a plurality of sub-frames.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes a plurality of gate lines; a plurality of data lines that cross the gate lines to define pixel regions; a plurality of thin film transistors at the crossings of the gate and data lines, the thin film transistors of vertically adjacent pixels each connected to a shared gate line of the plurality of gate lines and on opposite sides of the shared gate line; and a plurality of pixel electrodes in the pixel regions, wherein each pixel electrode of the plurality of pixel electrodes is formed in two horizontally-adjacent pixel regions.

In another aspect of the present invention, a liquid crystal display device includes: a plurality of first and second gate lines; a plurality of first to fourth data lines crossing the first and second gate lines to define pixel regions; a plurality of pixels, wherein each pixel includes from four horizontally-adjacent pixel regions; and a plurality of thin film transistors (TFTs) at the crossings of the first gate lines and the first and second data lines and at the crossings of the second gate lines and the third and fourth data lines.

In another aspect of the present invention, a method for driving a liquid crystal display device including a plurality of gate lines, a plurality of data lines crossing the gate lines to define pixel regions, and a plurality of pixel electrodes in the pixel regions, wherein one pixel electrode is formed in two horizontally-adjacent pixel regions, the liquid crystal display device driven in a plurality of sub-frames divided from one frame includes: supplying a scan pulse to a gate line; supplying data signals to pixels arranged to be vertically adjacent to each other at opposite sides of the gate line to charge the pixels with the data signals; and irradiating light onto the pixels charged with the data signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and along with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
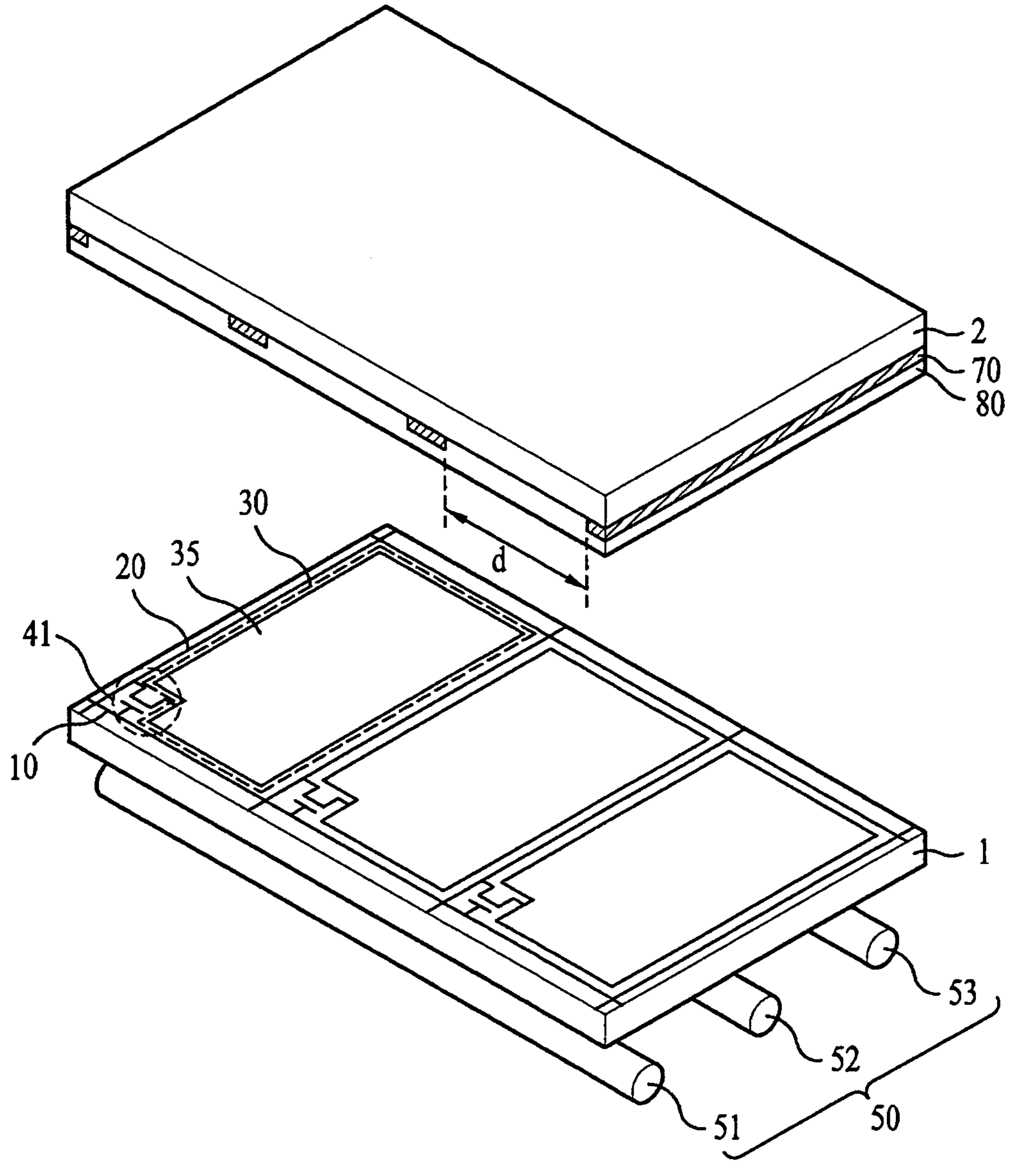
FIG. 1 Related Art
FIG. 1 is a perspective view schematically illustrating an LCD device of the related art using a field sequential driving system.
Figure 2:
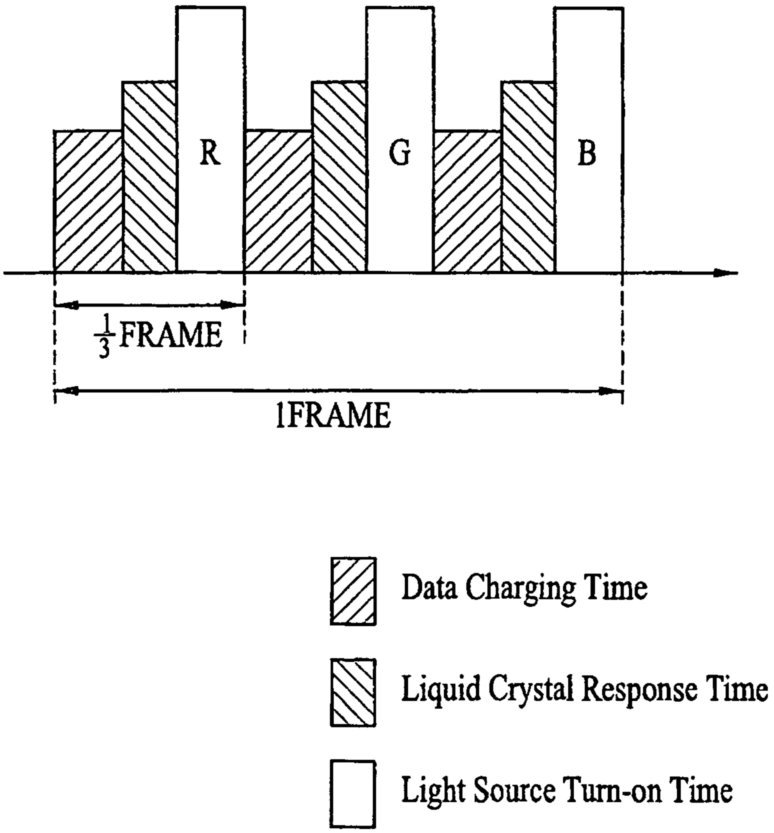
FIG. 2 Related Art
FIG. 2 is a timing diagram to explain driving of the field sequential driving type LCD device shown in FIG. 1.
Figure 3:
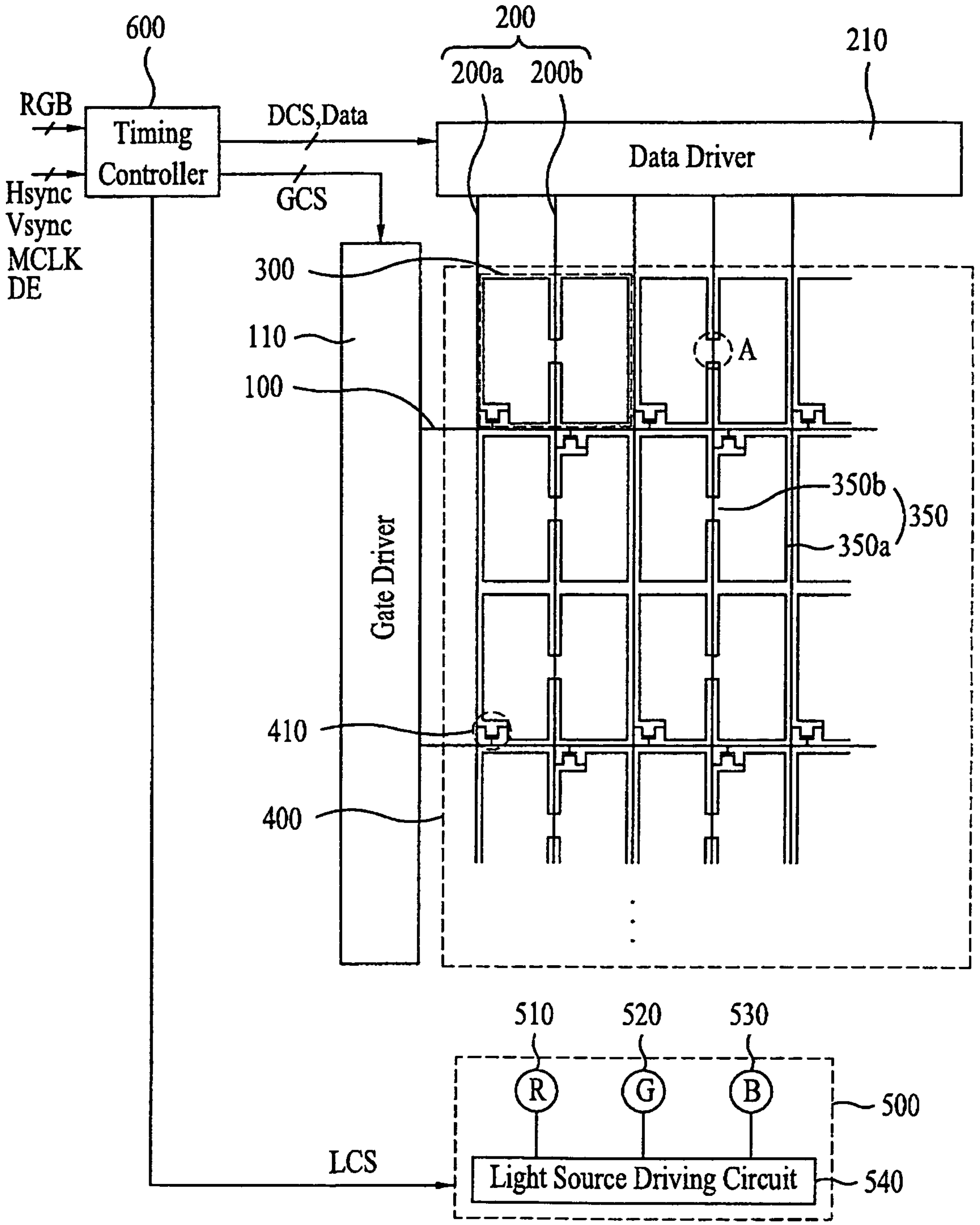
FIG. 3 is a plan view schematically illustrating an LCD device according to a first embodiment of the present invention.

FIG. 3 is a plan view schematically illustrating a liquid crystal display (LCD) device according to a first embodiment of the present invention.

As shown in FIG. 3, the LCD device according to the first embodiment of the present invention includes a liquid crystal panel 400 including a plurality of gate lines 100 and a plurality of data lines 200 crossing the gate lines 100 to define pixel regions, wherein one pixel 300 is formed to include two horizontally-adjacent pixel regions, and a backlight unit 500 for sequentially irradiating red (R), green (G), and blue (B) lights to the liquid crystal panel 400. The LCD device also includes a data driver 210 for dividing one frame into a plurality of sub-frames and supplying data to the data lines 200 of the liquid crystal panel 400 for every sub-frame, a gate driver 110 for supplying scan pulses to the gate lines 100 of the liquid crystal panel 400, and a timing controller 600 for controlling the gate driver 110, data driver 210, and backlight unit 500.

The gate lines 100 and data lines 200, which are included in the liquid crystal panel 400, cross each other. In particular, each data line 200 overlaps with the associated pixel region. The liquid crystal panel 400 also includes thin film transistors (TFTs) 410 each formed at the crossings of the gate lines 100 and data lines 200. A plurality of pixel electrodes 350 are formed in the pixels 300, wherein one pixel electrode 350 is formed in each of two horizontally-adjacent pixel regions. The plurality of pixel electrodes 350 are connected to the TFTs 410, respectively. Two pixels 300 are vertically arranged between the adjacent two gate lines 100.

The TFTs 410 are arranged at opposite sides of the gate line 100 in a zigzag pattern along a gate line 100 and the TFTs 410 in pixels arranged to be vertically adjacent to each other are at opposite sides of each gate line 100 and are connected to the gate line 100 such that they simultaneously receive a scan pulse from the gate line 100. Since the two pixels 300 positioned vertically-adjacent with respect to a single gate line are simultaneously driven by the corresponding gate line 100, the number of the gate lines 100 for a given sized display is reduced by one-half. Accordingly, it is possible to secure a time for sufficiently charging a data voltage via the pixel electrodes 350.

Furthermore, it is possible to reduce the time taken to drive all gate lines 100, and thus, to secure a sufficient liquid crystal response time and a sufficient light source turn-on time.

Because the LCD display device according to the first embodiment of the present invention is configured such that the vertically-adjacent pixels 300 simultaneously are driven by one gate line 100, as described above, the TFTs 410 of the vertically-adjacent pixels 300 are connected to different data lines, for example, data lines 200*a* and 200*b*, respectively.

If the TFTs 410 of the vertically-adjacent pixels 300 received data from the same data line while receiving a scan pulse from the same gate line 100, the desired image would not be displayed because the same data would be supplied to the vertically-adjacent two pixels 300.

As a portion the data lines 200*a* and 200*b*, in particular, the data lines 200*b*, overlap with the pixel electrodes 350, particular regions of the pixel electrodes 350 where connecting electrodes are arranged, as will be described hereinafter.

Because the data lines 200 overlap with the pixel electrodes 350, parasitic capacitance is generated therebetween. As a result, the LCD device may exhibit a degradation in picture quality because the data supplied through the data lines 200 may leak, and thus be modulated by the parasitic capacitance.

In accordance with the illustrated embodiment of the present invention, each pixel electrode 350 includes sub-pixel electrodes 350*a* formed in the pixel regions defined by the gate line 100 and data lines 200, and connecting electrodes 350*b* each formed between the horizontally-adjacent two sub-pixel electrodes 305*a* to electrically connect the horizontally-adjacent two sub-pixel electrodes 350*a*. Each connecting electrode 350*b* has a width smaller than that of the sub-pixel electrode 350*a*.

The width of each connecting electrode 350*b* is made smaller than the width of each sub-pixel electrode 350*a* to minimize a region A where the connecting electrode 350*b* overlaps with the data line 200, and thus, to reduce parasitic capacitance.

If the width of the connecting electrode 350*b* is increased, the parasitic capacitance generated between the connecting electrode 350*b* and the data line 200 increases and the LCD device may exhibit a degradation in picture quality because the data voltage supplied through the data line 200 may leak, and thus, be modulated by the increased parasitic capacitance.

The timing controller 600 generates a data control signal (DCS), a gate control signal (GCS), and a light source control signal (LCS), using a horizontal synchronizing signal (Hsync), a vertical synchronizing signal (Vsync), a main clock (MCLK), and a data enable signal (DE) provided from a source externally to the liquid crystal display device.

The timing controller 600 also re-arranges, or aligns, externally-input source data RGB in the order of R, G, and B data compatible with the field sequential driving system, and then sequentially supplies the aligned R, G, B data to the data driver 210 for every respective sub-frame.

The gate driver 110 sequentially shifts the gate control signal GCS from the timing controller 600 in accordance with gate shift clocks, to supply a scan pulse to each gate line for every sub-frame.

The data driver 210 samples the data supplied from the timing controller 600 in accordance with the data control signal (DCS) from the timing controller 600, converts the sampled data to analog data, and supplies the resultant data to the data lines 200.

In particular, the data driver 210 supplies R data to each data line 200 in the first sub-frame, supplies G data to each data line 200 in the second sub-frame, and supplies B data to each data line 200 in the third sub-frame.

The backlight unit 500 includes an R light source 510 for irradiating R light to the liquid crystal panel 400, a G light source 520 for irradiating G light to the liquid crystal panel 400, and a B light source 530 for irradiating B light to the liquid crystal panel 400. The backlight unit 500 also includes a light source driving circuit 540 for driving the R, G, and B light sources 510, 520, and 530.

The R, G, and B light sources 510, 520, and 530 sequentially irradiate R, G, and B lights to the liquid crystal panel 400 during the sub-divided portions of one frame in response to drive signals from the light source driving circuit.

Each of the light sources 510, 520, and 530 may include a fluorescent lamp or a light emitting diode.

The light source driving circuit 540 sequentially drives the R, G, and B light sources 510, 520, and 530 in every sub-frame in response to a light source control signal (LCS) from the timing controller 600.

For example, in response to the light source control signal LCS, the light source driving circuit 540 may drive the R light source 510 in the first sub-frame after R data has been charged in first pixels and the liquid crystal has responded to the charged R data. In the second sub-frame, the light source driving circuit 540 may drive the G light source 520 after G data has been charged in second pixels and the liquid crystal has responded to the charged G data. In the third sub-frame, the light source driving circuit 540 may drive the B light source 530 after B data has been charged in third pixels and the liquid crystal has responded to the charged B data.

Figure 4:
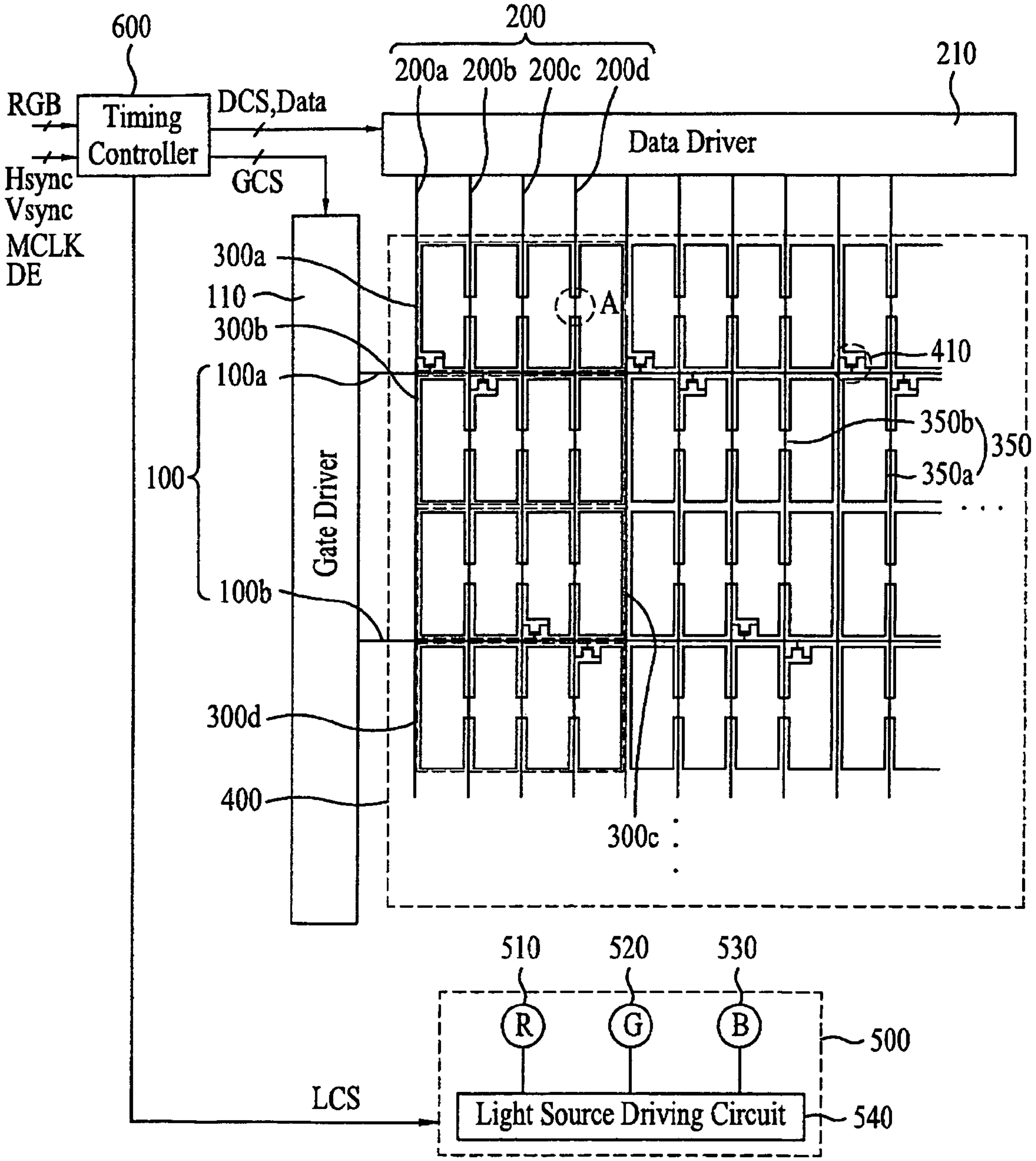
FIG. 4 is a plan view schematically illustrating an LCD device according to a second embodiment of the present invention.

FIG. 4 is a plan view schematically illustrating an LCD device according to a second embodiment of the present invention.

Referring to FIG. 4, the LCD device according to the second embodiment of the present invention is similar to the LCD device according to the first embodiment, except for the number of data lines 200 and the structure of the liquid crystal panel 400.

In the LCD device according to the second embodiment of the present invention, the liquid crystal panel 400 is configured such that one pixel 300 includes four horizontally-adjacent pixel regions, and a plurality of thin film transistors (TFTs) 410 formed at the crossings of odd gate lines 100 and (4n−3)th and (4n−2)th data lines 200 and the crossings of even gate lines 100 and (4n−1)th and (4n)th data lines 200, where n is a natural number. The TFTs 410 are arranged at opposite sides of the gate line 100 in a zigzag arrangement along with the gate line 100. Two pixels 300 are vertically arranged between the adjacent two gate lines 100.

The TFTs 410 of a first pair of pixels 300 vertically adjacent to each other are arranged at opposite sides of one gate line, namely, a first gate line 100*a*, and the TFTs 410 of a second pair of vertically adjacent pixels 300*c* and 300*d* are at opposite sides of another gate line, namely, a second gate line 100*b*. The respective TFTs of each the first and second pair of pixels are connected to different data lines 200*a*, 200*b*, 200*c*, and 200*d*, respectively.

This configuration will be described in more detail. The liquid crystal panel 400 of the LCD device according to the second embodiment of the present invention mainly includes a plurality of first (odd) and second (even) gate lines 100*a* and 100*b*. The liquid crystal panel 400 also includes a plurality of first (4n−3)th to fourth (4n)th data lines 200*a*, 200*b*, 200*c*, and 200*d* arranged to cross the first and second gate lines 100*a* and 100*b*, and a plurality of pixels 300 in the pixel regions, wherein one pixel 300 is formed in horizontally-adjacent four pixel regions.

That is, the liquid crystal panel 400 includes a plurality of first pixels 300*a* that receive a data signal from the first data line 200*a* through the corresponding TFT 410 in accordance with the scan pulse from the first gate line 100*a*, a plurality of second pixels 300*b* that receive a data signal from the second data line 200*b* through the corresponding TFT 410 in accordance with the scan pulse from the first gate line 100*a*, a plurality of third pixels 300*c* that receive a data signal from the third data line 200*c* through the corresponding TFT 410 in accordance with the scan pulse from the second gate line 100*b*, and a plurality of fourth pixels 300*d* that receive a data signal from the fourth data line 200*d* through the corresponding TFT 410 in accordance with the scan pulse from the second gate line 100*b*.

Although the number of data lines 200 in the LCD device of the second embodiment increases to double that of the LCD device of the first embodiment, the time taken to drive all gate lines 100 is further reduced by half because the two gate lines 100*a* and 100*b* are simultaneously driven. Accordingly, it is possible to secure a time for sufficiently charging data into the pixels 300 even for large LCD devices.

Figure 5:
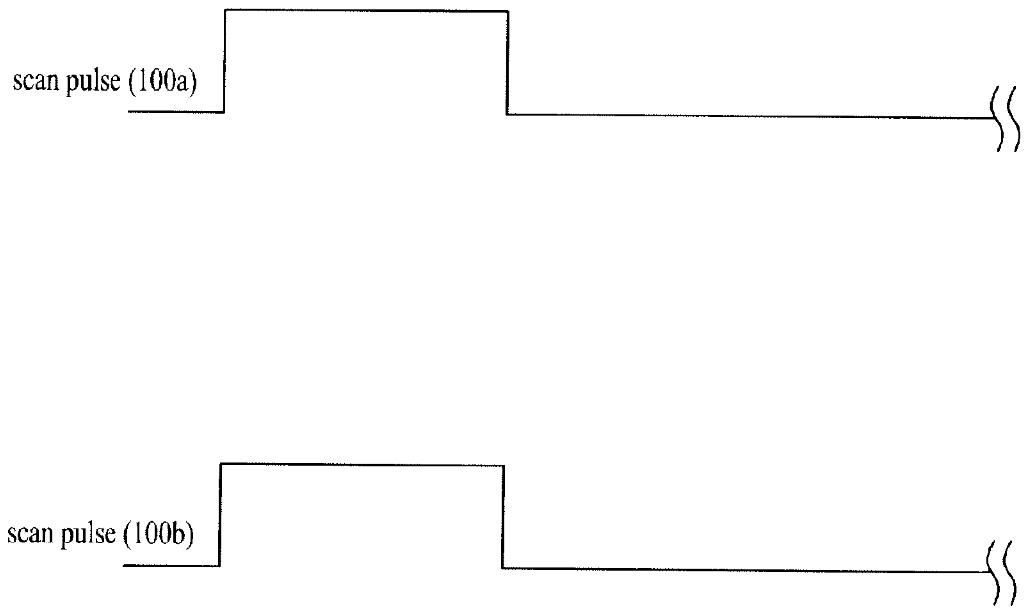
FIG. 5 is a timing diagram exemplifying simultaneously driving the first and second gate lines.

In the LCD device according to the second embodiment of the present invention, the vertically-adjacent pixels 300 are connected to the gate line 100 arranged therebetween so that they simultaneously receive the scan pulse from the gate line 100. Also, as illustrated in FIG. 5, scan pulses 100*a* and 100*b* are simultaneously supplied to two gate lines 100 in this LCD device. Accordingly, it is possible to supply scan pulses to all gate lines 100 within a time corresponding to one fourth of the time taken to drive all gate lines 100 as for the LCD device of the related art.

Because supplying the scan pulses to all of the gate lines 100 may be completed within a shortened period of time, it is possible to lengthen the turn-on time of the TFTs 410 to sufficiently charge data into the pixels without increasing the size of the TFTs 410.

Although embodiments of the present invention have been described illustrating the case in which a scan pulse is simultaneously supplied to two gate lines 100, it may be possible to simultaneously supply a scan pulse to three, four, or more gate lines 100, as long as the number of data lines 200 is appropriately increased.

As apparent from the above description, the present invention may provide the following effects.

By sharing each gate line between the vertically-adjacent pixels arranged at opposite sides of the gate line, a scan pulse is simultaneously supplied to at least two gate lines so that the time taken to input scan pulses to all gate lines may be reduced. Accordingly, even when a field sequential system is used, it is possible to secure a sufficient data charging time without an increase in the size of TFTs.

In accordance with the reduction in the time taken to input scan pulses to all gate lines, it is also possible to secure a sufficient liquid crystal response time and a sufficient light source turn-on time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a plurality of gate lines;

a plurality of data lines that cross the gate lines to define pixel regions;

a plurality of pixels, wherein each pixel includes a single pixel electrode from two horizontally-adjacent pixel regions and a connecting portion, wherein a first portion of the single pixel electrode from one of the two horizontally-adjacent pixel regions, a second portion of the single pixel electrode from another of the two horizontally-adjacent pixel regions, and the connecting portion are contiguous; and a plurality of thin film transistors at the crossings of the gate lines and data lines, with one each in each pixel, respectively, wherein the thin film transistors of two vertically-adjacent pixels are each connected to a shared gate line of the plurality of gate lines and on opposite sides of the shared gate line, wherein each of the thin film transistors is each connected to one pixel electrode;

wherein the connecting portion has a width smaller than that of each pixel region, wherein the thin film transistors of the two vertically-adjacent pixels are connected to different data lines respectively, and wherein every other data line is overlapped with a connecting portion of one of the plurality of pixels.

2. The liquid crystal display device according to claim 1, wherein vertically-adjacent pixel electrodes on opposite sides of a shared gate line are simultaneously driven using the shared gate line.

3. The liquid crystal display device according to claim 1, further comprising:

a backlight unit that sequentially illuminates the pixel regions with light of different colors during sub-frames, respectively.

4. The liquid crystal display device according to claim 1, wherein two pixel electrodes are vertically arranged between adjacent gate lines.

5. A liquid crystal display device comprising:

a plurality of first gate lines and a plurality of second gate lines;

a plurality of first to fourth data lines crossing the first and second gate lines to define pixel regions;

a plurality of pixels, wherein each pixel includes a single pixel electrode from four horizontally-adjacent sub-pixel regions and three connecting portions, wherein four portions of the single pixel electrode one each in the four horizontally-adjacent pixel regions and the three connecting portions are contiguous, and a plurality of thin film transistors at the crossings of the first gate lines and the first and the second data lines and at the crossings of the second gate lines and the third and the fourth data lines, with one thin film transistor in each pixel, respectively, wherein the plurality of pixels include a plurality of first pixels that receive a data signal from the first data lines in accordance with the scan pulse from the first gate lines, a plurality of second pixels that receive a data signal from the second data lines in accordance with the scan pulse from the first gate lines, a plurality of third pixels that receive a data signal from the third data lines in accordance with the scan pulse from the second gate lines, and a plurality of fourth pixels that receive a data signal from the fourth data lines in accordance with the scan pulse from the second gate lines, and wherein each of the three connecting portions has a width smaller than that of each pixel region, and wherein three data lines out of the first to fourth data lines in each of the plurality of first to fourth data lines are each overlapped with one of the three connecting portions of one of the plurality of pixels.

6. The liquid crystal display device according to claim 5, wherein the plurality of thin film transistors are arranged at opposite sides of the first gate lines and the second gate lines in zigzags.

7. The liquid crystal display device according to claim 6, wherein the first and the second pixels are vertically adjacent to each other at opposite sides of the first gate lines.

8. The liquid crystal display device according to claim 6, wherein the third and the fourth pixels are vertically adjacent to each other at opposite sides of the second gate lines.

9. The liquid crystal display device according to claim 6, wherein a scan pulse is simultaneously supplied to a pair of the first and the second gate lines.

10. The liquid crystal display device according to claim 5, wherein two pixels are vertically arranged between adjacent gate lines.

11. The liquid crystal display device according to claim 5, wherein vertically-adjacent pixels at opposite sides of a pair of the first and the second gate lines are simultaneously driven using the corresponding first and the second gate lines.

12. The liquid crystal display device according to claim 5, wherein each connecting portion is overlapped with one of the first to fourth data lines.

13. The liquid crystal display device according to claim 5, further comprising:

a backlight unit that irradiates light of a different color in each respective sub-frame of a frame.

* * * * *